US009304009B2

(12) United States Patent
Beaurepaire et al.

(10) Patent No.: US 9,304,009 B2
(45) Date of Patent: Apr. 5, 2016

(54) METHOD AND APPARATUS FOR PROVIDING PASSENGER EMBARKATION POINTS FOR POINTS OF INTERESTS

(71) Applicant: HERE Global B.V., Veldhoven, LB (NL)

(72) Inventors: Jerome Beaurepaire, Berlin (DE); Marko Tapio Tuukkanen, Schlenzer (DE)

(73) Assignee: HERE GLOBAL B.V., Veldhoven (NL)

( * ) Notice: Subject to any disclaimer, the term of this patent is extended or adjusted under 35 U.S.C. 154(b) by 81 days.

(21) Appl. No.: 14/172,733

(22) Filed: Feb. 4, 2014

(65) Prior Publication Data

US 2015/0219464 A1   Aug. 6, 2015

(51) Int. Cl.
*G01C 21/34* (2006.01)
*G01C 21/36* (2006.01)

(52) U.S. Cl.
CPC ........ *G01C 21/3617* (2013.01); *G01C 21/3438* (2013.01)

(58) Field of Classification Search
None
See application file for complete search history.

(56) References Cited

U.S. PATENT DOCUMENTS

| | | | | |
|---|---|---|---|---|
| 6,697,730 | B2 * | 2/2004 | Dickerson | G08G 1/202 340/907 |
| 2003/0187875 | A1 * | 10/2003 | Nakase | G06F 17/18 |
| 2009/0055094 | A1 | 2/2009 | Suzuki | |
| 2011/0191019 | A1 * | 8/2011 | Holsinger | G01C 21/00 701/533 |
| 2013/0046456 | A1 * | 2/2013 | Scofield | G01C 21/3423 701/117 |
| 2013/0144471 | A1 | 6/2013 | Min et al. | |
| 2013/0158859 | A1 | 6/2013 | Sathish | |
| 2013/0231824 | A1 * | 9/2013 | Wilson | G05D 1/0088 701/26 |
| 2014/0005924 | A1 * | 1/2014 | Letz | G01C 21/3484 701/424 |
| 2014/0038640 | A1 * | 2/2014 | Wesselius | G08G 1/202 455/456.1 |
| 2014/0181741 | A1 * | 6/2014 | Apacible | G06Q 10/109 715/810 |
| 2015/0112585 | A1 * | 4/2015 | Knepper | G06Q 30/0266 701/410 |

FOREIGN PATENT DOCUMENTS

| | | |
|---|---|---|
| CN | 102592460 A | 7/2012 |
| EP | 2351987 A2 | 8/2011 |
| JP | 2008158578 A | 7/2008 |
| JP | 2010237158 A | 10/2010 |
| KR | 1020080074578 A | 8/2008 |

(Continued)

OTHER PUBLICATIONS

International Preliminary Report on Patentability for International Application No. PCT/EP2015/050947, mailed Apr. 17, 2015, 4 pages.

(Continued)

*Primary Examiner* — Shelley Chen
(74) *Attorney, Agent, or Firm* — Ditthavong & Steiner, P.C.

(57) ABSTRACT

An approach is provided for determining a recommended passenger embarkation point to associate with a point of interest. An embarkation platform determines one or more candidate passenger embarkation points. The embarkation platform also processes contextual information associated with the one or more passenger embarkation points, the at least one passenger, the at least one vehicle, or a combination thereof to determine at least one recommended passenger embarkation point from among the one or more candidate passenger embarkation points. Information regarding the at least one recommended embarkation point is then caused to be presented.

20 Claims, 9 Drawing Sheets

(56) References Cited

FOREIGN PATENT DOCUMENTS

| WO | 2011056295 A1 | 5/2011 |
| WO | 2013115988 A1 | 8/2013 |

OTHER PUBLICATIONS

Notification of Transmittal of Translation of the International Preliminary Report on Patentability (Chapter I or Chapter II) along with Written Opinion of the International Searching Authority for International Application No. PCT/EP2015/050947, mailed Apr. 17, 2015, 6 pages.

"Mobility 8 Features About Hitachi's Ropits", The Economic Times, Science & Technology, dated, Publication Date: Apr. 4, 2013, retrieved from URL http://economictimes.indiatimes.com/slideshows/science-technology/mobility-robot-8-features-about-hitachis-ropits/1-autonomous-pick-up-and-drop-off-function/slideshow/19383910.cms >, 3 pages.

Suppe et al., "Semi-Autonomous Virtual Valet Parking", Proceedings of the Second International conference on Automotive User Interfaces and Interactive Vehicular applications (AutomotiveUI 2010), Nov. 11-12, 2010, 4 pages.

"Motorcoach Parking and Drop-Off/Pick-Up Locations", retrieved from URL http://www.godcgo.com/Portals/0/Content%/20Images/Motorcoach_06_12Parking%20and%20Drop-Off_Pick-Up%20Locations%20Listing.pdf, last retrieved on May 9, 2014, 3 pages.

"Drop Off and Pick Up" London Luton Airport, retrieved from URL http://www.london-luton.co.uk/en/content/7/173/drop-off-and-pick-up.html, last retrieved on May 9, 2014, 2 pages.

\* cited by examiner

100

METHOD AND APPARATUS FOR PROVIDING PASSENGER EMBARKATION POINTS FOR POINTS OF INTERESTS

BACKGROUND

Service providers and device manufacturers (e.g., wireless, cellular, etc.) are continually challenged to deliver value and convenience to consumers by, for example, providing compelling network services. One area of interest has been the development of location-based services to provide users of mobile devices (e.g., mobile phones) tools for improving their driving experience. By way of example, many mobile devices are equipped with global positioning sensors (GPS) and navigation and/or mapping applications for presenting location-based information to users (e.g., in-vehicle navigation and telematics services, maps, travel directions, route details, points of interest (POIs) and the like). Unfortunately, service providers and device manufacturers face significant technical challenges in providing a service for conveying relevant embarkation information related to a point of interest.

SOME EXAMPLE EMBODIMENTS

Therefore, there is a need for an approach for determining a recommended passenger embarkation point to associate with a point of interest.

According to one embodiment, a method determining one or more candidate passenger embarkation points associated with at least one point of interest, wherein the one or more candidate passenger embarkation points are for at least one drop off or at least one pick up of at least one passenger of at least one vehicle. The method also comprises processing and/or facilitating a processing of contextual information associated with the one or more passenger embarkation points, the at least one passenger, the at least one vehicle, or a combination thereof to determine at least one recommended passenger embarkation point from among the one or more candidate passenger embarkation points. The method further comprises causing, at least in part, a presentation of information for (1) navigating to the at least one recommended passenger embarkation point as at least one waypoint on a route to at least one point of interest, (2) determining an availability of the at least one recommended passenger embarkation point, (3) performing the at least one drop off or the at least one pick up of the at least one passenger at the at least one recommended embarkation point, or (4) a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine one or more candidate passenger embarkation points associated with at least one point of interest, wherein the one or more candidate passenger embarkation points are for at least one drop off or at least one pick up of at least one passenger of at least one vehicle. The apparatus is also caused to process and/or facilitate a processing of contextual information associated with the one or more passenger embarkation points, the at least one passenger, the at least one vehicle, or a combination thereof to determine at least one recommended passenger embarkation point from among the one or more candidate passenger embarkation points. The apparatus is further caused to cause, at least in part, a presentation of information for (1) navigating to the at least one recommended passenger embarkation point as at least one waypoint on a route to at least one point of interest, (2) determining an availability of the at least one recommended passenger embarkation point, (3) performing the at least one drop off or the at least one pick up of the at least one passenger at the at least one recommended embarkation point, or (4) a combination thereof.

According to another embodiment, a computer-readable storage medium carries one or more sequences of one or more instructions which, when executed by one or more processors, cause, at least in part, an apparatus to determine one or more candidate passenger embarkation points associated with at least one point of interest, wherein the one or more candidate passenger embarkation points are for at least one drop off or at least one pick up of at least one passenger of at least one vehicle. The apparatus is also caused to process and/or facilitate a processing of contextual information associated with the one or more passenger embarkation points, the at least one passenger, the at least one vehicle, or a combination thereof to determine at least one recommended passenger embarkation point from among the one or more candidate passenger embarkation points. The apparatus is further caused to cause, at least in part, a presentation of information for (1) navigating to the at least one recommended passenger embarkation point as at least one waypoint on a route to at least one point of interest, (2) determining an availability of the at least one recommended passenger embarkation point, (3) performing the at least one drop off or the at least one pick up of the at least one passenger at the at least one recommended embarkation point, or (4) a combination thereof.

According to another embodiment, an apparatus comprises means for determining one or more candidate passenger embarkation points associated with at least one point of interest, wherein the one or more candidate passenger embarkation points are for at least one drop off or at least one pick up of at least one passenger of at least one vehicle. The apparatus also comprises means for processing and/or facilitating a processing of contextual information associated with the one or more passenger embarkation points, the at least one passenger, the at least one vehicle, or a combination thereof to determine at least one recommended passenger embarkation point from among the one or more candidate passenger embarkation points. The apparatus further comprises means for causing, at least in part, a presentation of information for (1) navigating to the at least one recommended passenger embarkation point as at least one waypoint on a route to at least one point of interest, (2) determining an availability of the at least one recommended passenger embarkation point, (3) performing the at least one drop off or the at least one pick up of the at least one passenger at the at least one recommended embarkation point, or (4) a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining a recommended passenger embarkation point to associate with a point of interest are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
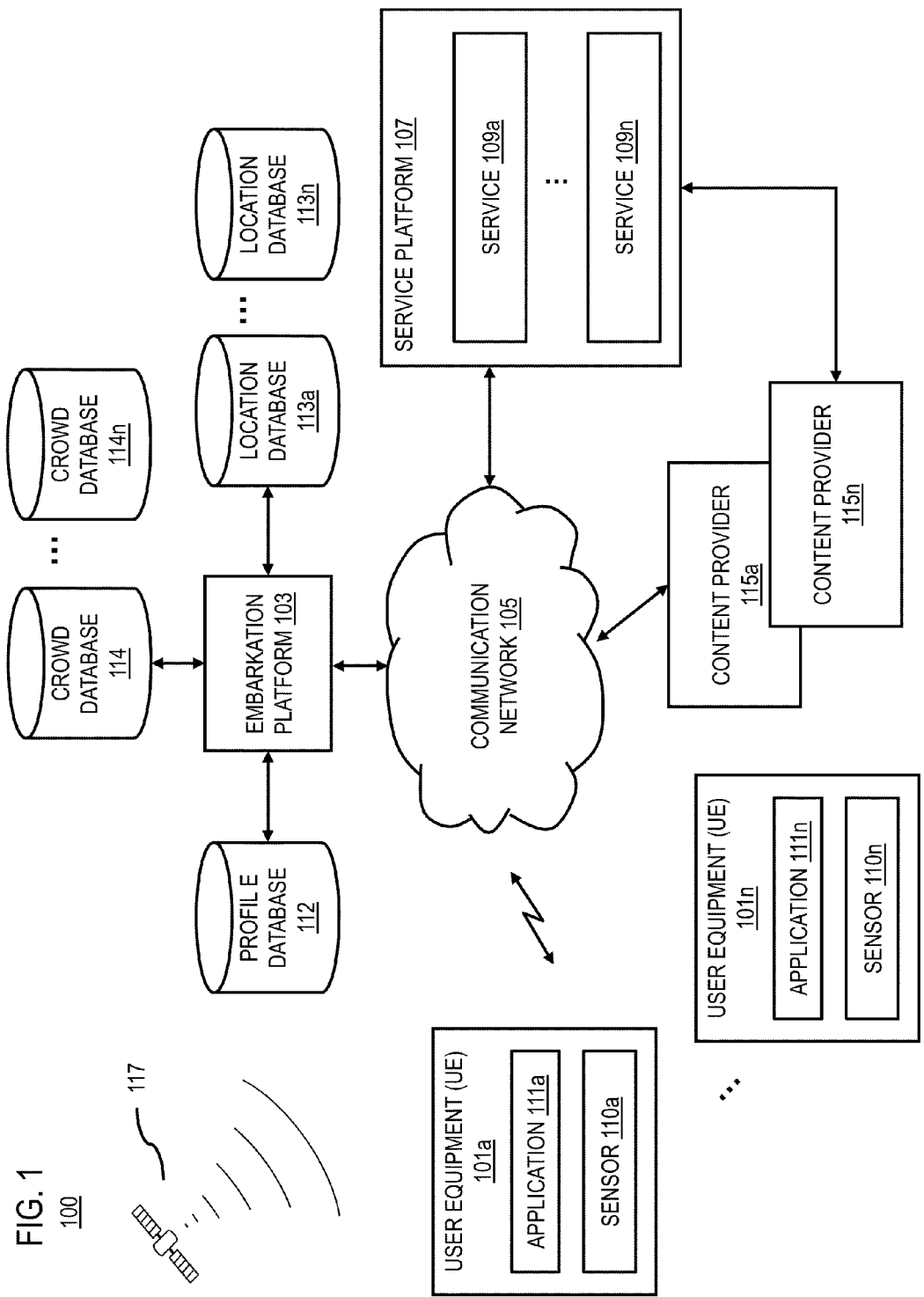
FIG. 1 is a diagram of a system for determining a recommended passenger embarkation point to associate with a point of interest, according to one embodiment.

FIG. 1 is a diagram of a system capable for determining a recommended passenger embarkation point to associate with a point of interest, according to one embodiment. As previously discussed, service providers and device manufactures are increasingly interested in developing location-based services to provide users of mobile devices (e.g., mobile phones) and vehicles with useful tools for navigating to destinations, improving the quality of their travels, etc. Further, it is increasingly popular for service providers and device manufacturers to bundle or make available navigation and/or mapping services (e.g., turn-by-turn navigation) on an array of user devices (e.g., mobile handsets, computers, navigation devices, etc.). Such devices may utilize location-based technologies (e.g., Global Positioning System (GPS) receivers, cellular triangulation, assisted-GPS (A-GPS), etc.) to provide a user with navigation and/or mapping information. Such information is particularly helpful when a user is determining directions to a point of interest that is unfamiliar to the user. However, there is a lack of available information about recommended embarkation points, i.e., a drop-off or pickup location of a passenger associated with points of interest. In one example embodiment, in a traditional vehicle, the at least one driver and the at least one passenger are different, whereas, in case of autonomous vehicles the driver may become a passenger at any point of time. In one scenario, the at least one autonomous vehicle may take over the driving task at the point of embarkation, wherein the at least one driver may leave the at least one autonomous vehicle and the autonomous vehicle may drive by itself to other destinations. In another example embodiment, the logic and the interface in which the at least one user sets the destination may be based, at least in part, on the vehicle sensor data, one or more user inputs, or a combination thereof. The interface may provide the at least one user with the options to select and/or define at least one 'pick up' and at least one 'drop off' location, when a waypoint or a destination is set.

By way of example, a user may want to travel to a new point of interest (e.g., a restaurant, a cinema, a stadium, etc.). The user can first enter the address of the point of interest into a navigation application associated with a mobile device (e.g., mobile phone) via the user interface (UI) of the device. The navigation application may then provide the user with turn-by-turn navigation instructions for enabling the user to drive from a starting location to the point of interest as specified. However, the navigation application is unable to specify a drop-off or pick-up location for the user at the point of interest relative to known restrictions (e.g., public safety, municipal, roadway, legal), conditions (e.g., traffic, parking, time, weather, environmental), other user feedback or the like. As a result, the device user is limited in their ability to determine a viable point in which to load or unload themselves and/or other passengers within proximity of the point of interest. In one example embodiment, the system 100 may process the contextual information of the at least one UE 101 associated with the at least one user and/or the at least one vehicle. For example, the system 100 may check the address from the at least one UE 101 associated with the at least one user and/or at least one vehicle during a pickup and a drop off at a certain location. The system 100 may associate the pickup and a drop off location with the at least one user, whereby the at least one driver's and the at least one passenger's calendar events may be coordinated. Such coordination of calendar information may be used to determine the at least one drop off location and/or destination for the at least one vehicle. In another example embodiment, when a passenger has a calendar event at a certain address, the driver may set a waypoint to that address or nearby, and may further set a destination somewhere else, it can be assumed that the passenger is going to be dropped off at his/her calendar address, pursuant to which the driver may proceed to go somewhere else. In one scenario, the autonomous vehicle may become the driver once the driver leaves, and the autonomous vehicle may drive by itself to its own calendar destinations. In a further example embodiment, the system 100 may learn through crowd sourcing at least one drop off point alongside one or more points where people should not be dropped off. In one scenario, the system 100 may determine that a particular drop off location is not proper because every time a vehicle stops to drop off a passenger it creates perturbations for the local traffic for the next 5 minutes. Such function of finding an appropriate location for drop off and pick up of the at least one passenger may be crucial for one or more autonomous cars.

To address this problem, system 100 of FIG. 1 enables users to access information regarding an embarkation point associated with a point of interest. Based on this information, at least one user associated with a vehicle destined for the point of interest may determine where to enter and/or exit the vehicle. The information regarding the embarkation point, along with other data related to the point of interest, may be conveyed to said user by way of a navigation service, location based service or the like of a mobile device of the user.

For the purpose of illustration herein, an embarkation point may include location information for indicating where a user (e.g., passenger) is to exit a vehicle along a path of continued travel of said vehicle. In addition, the embarkation point may include location information for indicating where a user (e.g., passenger) is to enter a vehicle along a path of continued travel of said vehicle. The path of travel may be a predetermined/expected route to be traveled by the vehicle or a current route of travel of the vehicle for reaching the point of interest.

Still further, the embarkation point may be associated with a period of active passenger use of the vehicle. For example, system 100 may convey information for depicting an embarkation point to a passenger during a period of idling of the engine, a moment of temporary stoppage of the vehicle, a limited period of loading and/or unloading of passengers and/or cargo to and/or from the vehicle or the like. It is noted, therefore, that information regarding the embarkation point may be useful for a limited period of drop off or pick up of one or more passengers and may be conveyed to the user to occur or be located before, at or after the vehicle has reached the final destination point associated with the point of interest. Furthermore, the embarkation point may be conveyed to the passenger to occur or be located before, at or after the vehicle has reached a designated or calculated parking location associated with the point of interest.

In one embodiment, the system 100 comprises one or more user equipment (UE) 101a-101n (also collectively referred to as UEs 101) having connectivity to an embarkation platform 103. The UEs 101 may be configured with one or more applications 111a-111n (also collectively referred to as applications 111) for interfacing with the embarkation platform 103 via a communication network 105. In addition, exemplary applications 111 may be location based applications for interfacing with a service platform 107 via communication network 105 for accessing turn-by-turn navigation, routing information, maps, driving instructions, etc. The service platform 107 may include one or more services 109a-109n (also collectively referred to as services 109) associated with the applications 111 for providing the travel-based information.

Under this scenario, the recommended embarkation point may be rendered to a UE 101 in conjunction with relevant location-based information for a given point of interest. As such, driving and walking instructions, estimated time-of-arrival data, venue information and the like may be presented along with one or more recommended embarkation points. The user interface of the application 111 may present the embarkation points as one or more graphical, textual, virtual or audible elements for depicting distinct drop-off or pick-up locations. It is noted that this data may be presented in addition to or instead of a final destination point, a parking location associated with the point of interest, or the like. In one scenario, the at least one recommended embarkation point may be presented by the network based routing server based, at least in part, on the inputs from the at least one user.

In one embodiment, the embarkation platform 103 may also interface with one or more location databases 113a-113n (also collectively referred to as location databases 113). The location databases 113 may exist in whole or part within the embarkation platform 103, or independently. In one embodiment, the location databases 113 are accessed by the embarkation platform 103 for determining information related to a point of interest. Based, at least in part on this information, one or more passenger embarkation points may then be determined by the platform 103. Data maintained by the database 113 may include a location of the point of interest (e.g., specific geographic coordinates or a corresponding address). In addition, name information, venue information, category information, contact details or other data associated with the point of interest may be maintained. For example, in the case of a stadium as a point of interest, the location database may house information for indicating the location, scheduled events at the stadium, event booking and/or ticket purchasing information, hours of operations or the like.

Still further, the location databases 113 may maintain information for indicating one or more restrictions, ordinances, rules or regulations that impact the ability of a user to utilize an embarkation point associated with a given point of interest. For example, the location database may include local ordinance, municipality data, traffic data or the like for indicating one or more parking restrictions, loading or unloading restrictions or lane restrictions. This may include times at which parking is permitted or restricted, roadway and/or lane closure details, bike or taxi lane requirements and locations, inclement weather rules, etc. Restrictions may vary from one geographic location to the next.

The information maintained by the location databases 113 are processed by the embarkation platform 103 as a means of distinguishing between (temporary) stopping locations and parking locations associated with a point of interest. Moreover, as will be discussed further, information from databases 113 may be used in connection with other data as contextual information regarding the user (e.g., passenger), the UE 101, a vehicle associated with the user, the point of interest, or a combination thereof. It is noted that location databases 113 may be compiled by one or more content providers 115a-115n.

In one embodiment, the embarkation platform 103 also interfaces with a profile database 112, which stores data related to one or more passengers that access the embarkation platform 103. The profile database 112 may exist in whole or part within the embarkation platform 103, or independently. The profile database 113 maintains credentials associated with a specific user of the application 111, user details, user preference information and like for uniquely identifying the UE 101 and/or the user requiring access to the embarkation platform 103. The profile, as created for the user and/or UE 101, may further indicate a typical, preferred or assigned mode of use of the application 111 of the user. For example, a "drop-off" or "pick-up" mode of operation of the application 111 may correspond to a request via the application 111 for navigating to one or more recommended embarkation points located around a point of interest. In contrast, a navigation mode or nearby parking mode of operation of the application corresponds to navigation to the final destination point of the point of interest of identifying associated parking for the point of interest. Of note, the embarkation platform 103 supports the former by enabling applications 111 to identify one or more suitable embarkation points to associate with the point of interest.

In addition, the profile database 112 may associate navigation usage pattern information with a profile of a user. The navigation usage pattern information may include data for indicating a typical route traveled by the user, date and time information associated with the travel route, historical drop-off or pick-up points, speed and/or travel duration information, etc. As noted previously, the UEs 101 may utilize location-based technologies (GPS receivers, cellular triangulation, A-GPS, etc.) to determine location and temporal information regarding the UEs 101. For instance, the UEs 101 may include GPS receivers (e.g., sensors 110a-110n) to obtain geographic coordinates from satellites 117 for determining current location and time associated with the UEs 101. When collected over a period of time, this information may be processed by the platform 103 to determine or "learn" a user's navigation usage patterns and/or travel tendencies. Analysis of the user's patterns in conjunction with the patterns of other users relative to a common point of interest or route of travel also enables continuous refinement of suitable embarkation points to associate with the point of interest.

In one embodiment, the embarkation platform 103 also accesses crowdsourcing information from one or more crowd databases 114a-114n (also collectively referred to as crowd databases 114). The crowd databases 114 may exist in whole or part within the embarkation platform 103, or independently. Crowdsourcing information may be accessed by the embarkation platform 103 for determining one or more candidate passenger embarkation points to associate with a point of interest. The crowdsourcing information may include feedback, instructions, comments or content of various forms for specifying one or more points of embarkation associated with a point of interest. For example, in the case of a restaurant being specified as a final destination/point of interest via the application 111, the crowd database 114 may be queried to determine recommended drop-off or pick-up locations near the restaurant. The information is provided by the restaurant owner, one or more restaurant reviewers or patrons, visitors to other nearby points of interest within proximity of the restaurant, or the like.

The crowdsourcing information may be culled from various sources, including from comments, feedback, message posts, reviews and other forms of content provided by one or more content providers 115a-115n (referred to collectively as content providers 115). This may include, for example, social networking content providers, consumer report content providers, news content providers, blog content providers, or the like and may include both institutional and individual providers. Any known or still developing methods, techniques or processes for generating, retrieving and/or accessing crowdsourcing information from one or more sources may be employed by the platform 103.

In one embodiment, the embarkation platform 103 accesses sensor data detected by the sensors 110a-110n (also collectively referred to as sensors 110) of the UEs 101, one or more sensors associated with a vehicle of the user, or a combination thereof. By way of example, the sensors may detect speed and location data, tilt data (e.g., a degree of incline or decline of the vehicle along a path of travel), motion data, light data, sound data, image data, weather data and the like. In addition, the sensors may detect current vehicle conditions, including seat belt status, vehicle condition (e.g., whether gas is needed), passenger status (e.g., the number of passengers actively seated), door or trunk status (e.g., locked/closed or unlocked/open), cargo weight or load capacity status, etc. For example, car seat sensor data may indicate the presence or absence of passengers within the vehicle en route to a specific point of interest. As another example, a door sensor, trunk sensor or the like can be used to detect the removal or loading of luggage/cargo during navigation of the user to a specific point of interest. Still further, sensors about the perimeter of the vehicle may detect the relative distance of the vehicle from sidewalks, lane or roadways, the presence of other vehicles, trees, benches, water, potholes and any other objects, or a combination thereof. In one embodiment, the order of events detected by one or more sensors may also be used in connection with the recommendation of the at least one embarkation point, for example, one or more sensors may detect that at least one driver is already seated, at least one luggage is placed in the trunk, and at least one passenger seat is occupied, it leads to a determination that the luggage belongs to the passenger and the passenger needs to remove the luggage from the trunk at the embarkation point. In another embodiment, the one or more sensors may provide in-vehicle navigation services, wherein one or more location based services may be provided to the at least one UE 101 associated with the at least one user of the vehicle and/or at least one other UE 101 associated with the at least one vehicle. In a further embodiment, the at least driver may become the passenger at any point whereupon the autonomous vehicle takes over the driving task, for example, a driver going to a cinema may leave the autonomous vehicle in front of the cinema hall, and the autonomous vehicle may continue from that location point to a parking location further away. The driver may define either the cinema hall or the parking location as the destination.

Still further, the sensors 110 may detect local or transient network and/or wireless signals, such as those transmitted by nearby devices during navigation of a vehicle associated with the user. This may include, for example, network routers as configured within a premise (e.g., home or business) or other UE 101 encountered during navigation to or within range of the point of interest. Other signals detected may include those transmitted by traffic related objects such as traffic lights, traffic cameras, signals, digital signage or the like. It is noted that, in certain implementations, the sensors of the vehicle may be configured to interact with the sensors 110 of the UE 101 for enabling data exchange and interaction. This exchange may be facilitated by way of any known or still developing range based or wireless communication protocols.

In one embodiment, the embarkation platform 103 uses the above described location information of databases 113, profile information of database 112, crowdsourcing data of databases 114 and sensor information as gathered by the sensors to determine one or more candidate or recommended embarkation points to associate with a specified point of interest. This includes, for example, processing the above described data as contextual information associated with the passenger, the vehicle, or a combination thereof in connection with location and/or travel based information (e.g., navigation or route instructions) regarding the point of interest. As such, the platform 103 is able to learn the tendencies of the passenger or the vehicle for travel to a specific point of interest. Based on this behavior, the platform 103 may then anticipate that the user, the vehicle or a combination thereof requires a drop off or pick up when approaching the point of interest.

Also, the availability of rich contextual information of various types enables the embarkation platform 103 to identify the most pertinent embarkation points (e.g., stopping locations) based on current user needs, the geographic locale of travel, existing environmental and traffic conditions, driving regulations and restrictions, etc. As such, the platform 103 is equipped to identify the most reliable, safe or feasible embarkation point within proximity to the point of interest based on multiple factors. In addition, the platform 103 may account for any blockages that may result from the pick-up or drop-off of passengers at said points, restrictions or limits to the user or the vehicle pursuant to the pick-up or drop-off of passengers at said points, or a combination thereof. In one example embodiment, the one or more sensors enables the at least one vehicle to identify the at least one driver and the at least one passenger, thereby making it possible to determine whether the at least one passenger may become a driver at a later point. In case, the platform 103 determines that the at least one identified passenger has never driven the specific vehicle, it may decide that it is unlikely that the passenger may take over the driving task. In another example embodiment, the platform 103 may determine the drop off location for the at least one identified person. Then, the platform 103 may connect at least one identified person to the at least one specific drop off locations, such association is beneficial when numerous people shares a ride repeatedly.

In one embodiment, the embarkation platform 103 may also calculate one or more currently available or just-in-time drop off or pick up points. Per this approach, the one or more drop off or pick up points may be determined for limited windows of opportunity relative to the point of interest. This may be based on the contextual information, including information from databases 113 for specifying time requirements and restrictions associated with various traffic lanes or locations, bus schedule information, etc. In addition, updated crowdsourcing information from databases 114 may be used for determining the most recent details regarding a point of interest while updated traffic information is processed to account for changing traffic conditions in the vicinity of the destination. Based on this array of data, the platform 103 may generate embarkation points that do not block bike lanes, emergency lanes, bus stops, bus lanes or the like. In addition, the recommended embarkation points may be associated with a time requirement corresponding to the window of opportunity (e.g., six minutes until the next bus is scheduled to arrive). In one scenario, the platform 103 may import location information stored in an offline map data, wherein a point of interest may have some association with one or more static locations recommended for drop off. On the other hand, the platform 103 may access online map data wherein the services may be more precise, for example, the one or more services may be described, such as, time based recommendations for drop off and/or pick up, weather awareness information, traffic awareness information, etc.

In one embodiment, the embarkation platform 103 causes the embarkation points to be rendered to a user interface of the application 111 for user review. As noted previously, the information may be presented to the user interface in graphical, textual, virtual or audible form and may be presented along with corresponding location or travel based information (e.g., maps, navigation instructions). In this way, the user is able to enhance the capability of their location based services and/or travel and navigation services by presenting locations along the map or route other than parking places, final destination points, etc. In one example embodiment, the user interface may not point at the one or more locations but may present something similar to a heat map representing a suitable drop off and/or a pick up areas for a point of interest, for example, one or more green areas on the map may depict a suitable drop off and/or pick up regions where traffic is not impacted by such activities, whereas the red areas on the map may depict areas that is inappropriate for drop off and/or pick up because such activity disturbs the traffic.

The information conveyed may include instructions for navigating to the recommended passenger embarkation point as a waypoint on a route to the point of interest. The information may also specify the availability of a recommended passenger embarkation point. For example, in the case where a limited amount of time is available for drop off or pick up to occur, the time availability is presented to the passenger or the driver of the vehicle. In one embodiment, this information may also be conveyed to other users or drivers within proximity of the recommended embarkation point. Per this approach, oncoming vehicles are warned or made aware of the current actions of the passenger at the drop off or pick up point for safety purposes. In one example embodiment, the platform 103 may determine other users and/or other vehicles over the network to gather location information, in order to provide recommendations to the at least one user and/or at least one vehicle, for example, during a concert, the platform 103 may propose an alternative drop off location for the at least one user and/or the at least one vehicle to prevent a blocking of the at least one vehicle by other vehicles. The platform 103 may determine that the at least one recommended drop off location may be crowded as it monitors the number of users navigating to the same location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or WiFi connection either through the inbuilt communication equipment or from the UE 101 associated with the vehicles. The applications 111a may assist in conveying information via the communication network 105. In such manner, information may be shared between the at least one vehicle and the at least one UE 101, between at least one UE 101 and the at least one other UE 101, or a combination thereof. In one scenario, the at least one passenger's UE 101 may propose a point of embarkation to the at least one driver's UE 101 and/or at least one UE 101 associated with the at least one vehicle.

By way of example, the UEs 101, embarkation platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
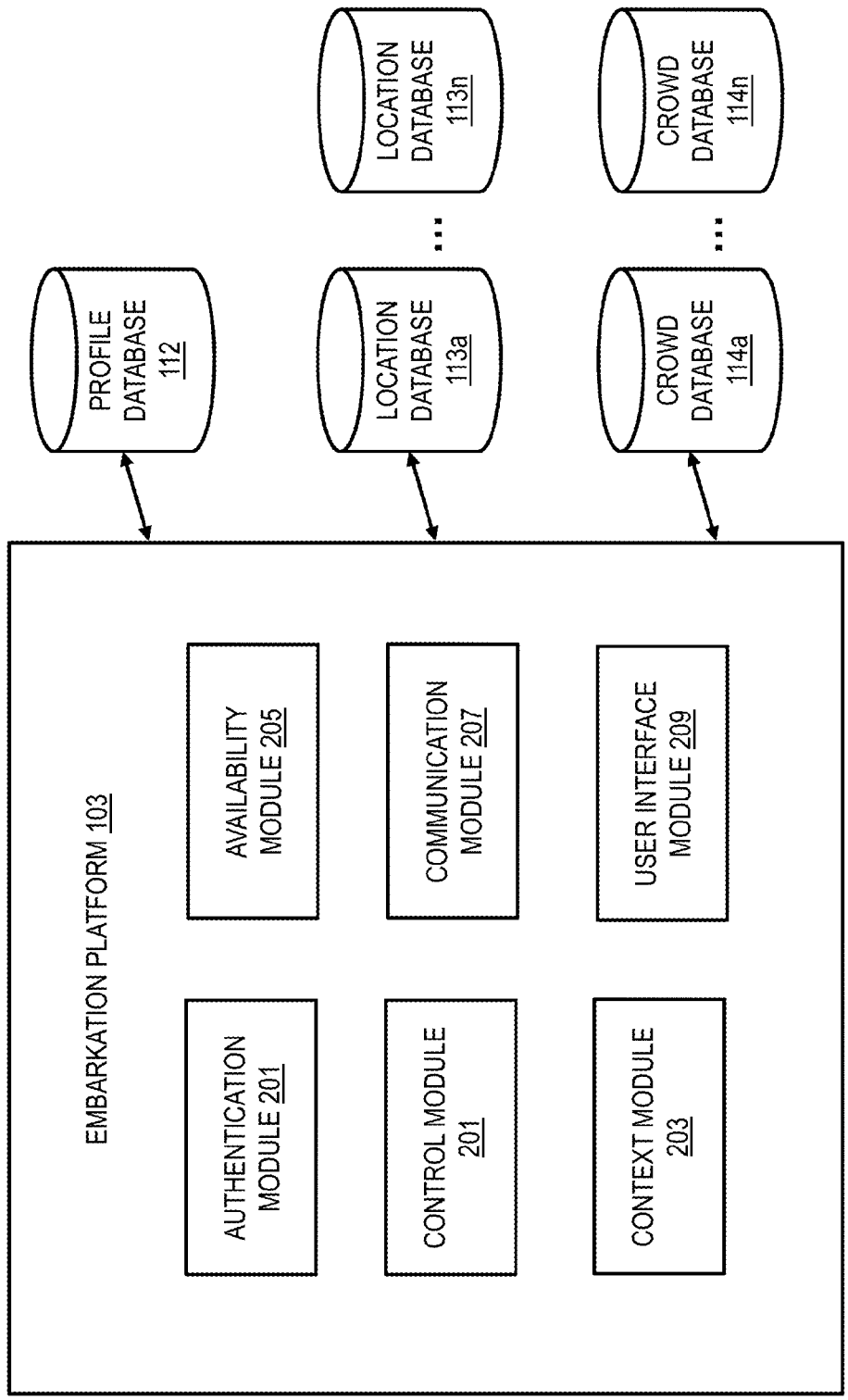
FIG. 2 is a diagram of the components of an embarkation platform, according to one embodiment.

FIG. 2 is a diagram of the components of the embarkation platform 103, according to one embodiment. By way of example, the embarkation platform 103 includes one or more components for determining embarkation points to associate with a point of interest. It is contemplated that the functions of these components may be combined in one or more components or performed by other components of equivalent functionality. In this embodiment, the embarkation platform 103 includes an authentication module 201, a control module 203, a context module 205, a segmentation module 205, a communication module 207 and a user interface module 209.

The authentication module 201 authenticates users and user devices 101a-101n for interaction with the embarkation platform 103. By way of example, the authentication module 201 receives a request to subscribe to the embarkation platform 103 via an application 111. The subscription process may correspond to the time of subscription, download or integration of the application 111 at the UE 101. Preferences and settings information, including a preferred mode of navigation (e.g., drop off versus destination point) may be established for the user and referenced to the user as a profile maintained in database 112.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the platform 103 (e.g., as enabled by user interface module 215). Registration data 217 for respective subscribers, which contains pertinent user or device profile data, may be cross referenced as part of the login process. Alternatively, the login process may be performed through automated association of profile data for the user and/or UE with an IP address, a carrier detection signal of a user device, mobile directory number (MDN), subscriber identity module (SIM) (e.g., of a SIM card), radio frequency identifier (RFID) tag or other identifier.

The control module 203 executes at least one algorithm for executing functions of the embarkation platform 103. For example, the control module 203 may execute an algorithm for processing a query associated with a UE 101 for location-based data (e.g., turn-by-turn navigation) for a point of interest (e.g., a restaurant). By way of another example, the control module 203 may execute an algorithm to interact with the context module 205 to determine the geographic or temporal context or situation of a UE 101. The control module 203 may also execute an algorithm to interact with the availability module 205 to determine the feasibility and/or availability of a recommended embarkation point relative to determined restrictions, requirements, transport schedules, lane regulations and other information as maintained by location databases 113. In addition, the control module 203 may execute an algorithm to interact with the communication module 207 to communicate among the embarkation platform 103, the services 109, the applications 111 and databases 112-114.

The context module 205 may process contextual information associated with one or more candidate embarkation points for further determining a recommended embarkation point. As such, contextual information may be used to further filter and/or refine an initial set of determined embarkation points for a given point of interest. Hence, an initial set of candidate passenger embarkation points may be refined to determine one or more recommended passenger embarkation points. For the purpose of illustration, the contextual information may include parking information, traffic information, traffic light information, public transport schedule information, a number of the at least one passenger, physical capability information of the at least one passenger, seat sensor information, luggage information, parcel information, environmental condition information, obstruction information, or a combination thereof. As noted previously, such context information is acquired by way of the services 109 including location based services and navigation services, sensors of the UE 101 and/or vehicle, data compiled per databases 112-114, or a combination thereof.

The context module 203 may also operate in connection with the application 111 to determine the geographic or temporal context or situation of a UE 101. This includes receiving relevant information from the various sensors 101 of the UE 101 for determining vehicular, user or environmental conditions as well as utilizing location-based data to determine current location (e.g., geographic coordinates) and temporal information (e.g., speed) regarding a UE 101. The context module 205 may also identify whether certain conditions or triggers have been met, such as whether a particular event has occurred, such as whether the user has reached the recommended embarkation point. The context module 205, in connection with the availability module 205, is also used to determine the location of the one or more embarkation points, one or more points of interest, or a combination thereof. Further, the context module 205 may determine to store the one or more embarkation points associated with the point of interest in connection with the profile of the user. In addition, this information may be stored to the location databases 113 for enabling continual learning and refining of the determination capacity of the platform 103 as well as stored to the crowd databases 114 for supporting sharing of the information with other users.

The availability module 205 analyzes the contextual information, as acquired per the context module 203, to determine one or more restrictions that distinguish one or more stopping locations from one or more parking locations. The stopping locations may correspond to viable embarkation points for a given point of interest whereas the parking locations may or may not be suited for accommodating the drop off or pick up of passengers. The availability module 205 also determines the one or more candidate passenger embarkation points, the at least one passenger embarkation point, or a combination thereof from among the one or more stopping locations. As noted previously, the one or more restrictions may include, at least in part, one or more parking restrictions, one or more lane restrictions, or a combination thereof.

The communication module 207 is used for communication between the embarkation platform 103, the services 109, the applications 111, and the various databases 112-114. The communication module 207 may be used to communicate commands, requests, data, etc. By way of example, the communication module 207 may be used to transit a request from a user interface (UI) of a UE 101 to obtain location-based information (e.g., turn-by-turn navigation) for a point of interest.

The user interface module 209 operates in connection with the communication module 207 to affect the presentment of information to a user interface of the application 111. For example, the user interface module presents a user with location-based information obtained from one or more location databases 113 regarding the one or more embarkation points associated with a point of interest. This may also include presenting availability information of an embarkation point as a message, as a timer, or the like. For example, if a determined pick up point corresponding to a bus lane is only available for four minutes until a bus is scheduled to arrive, this embarkation point may be presented along with elapsed timer data. The user interface module 209 may facilitate the exchange this information to other UE 101 or vehicles within proximity of the embarkation point per the communication module 207.

The above presented modules and components of the embarkation platform 103 can be implemented in hardware, firmware, software, or a combination thereof. Though depicted as a separate entity in FIG. 1, it is contemplated that the platform 103 may be implemented for direct operation by respective UEs 101. As such, the embarkation platform 103 may generate direct signal inputs by way of the operating system of the UE 101 for interacting with the application 111. In another embodiment, one or more of the modules 201-209 may be implemented for operation by respective UEs as a platform 103, or combination thereof.

Figure 3:
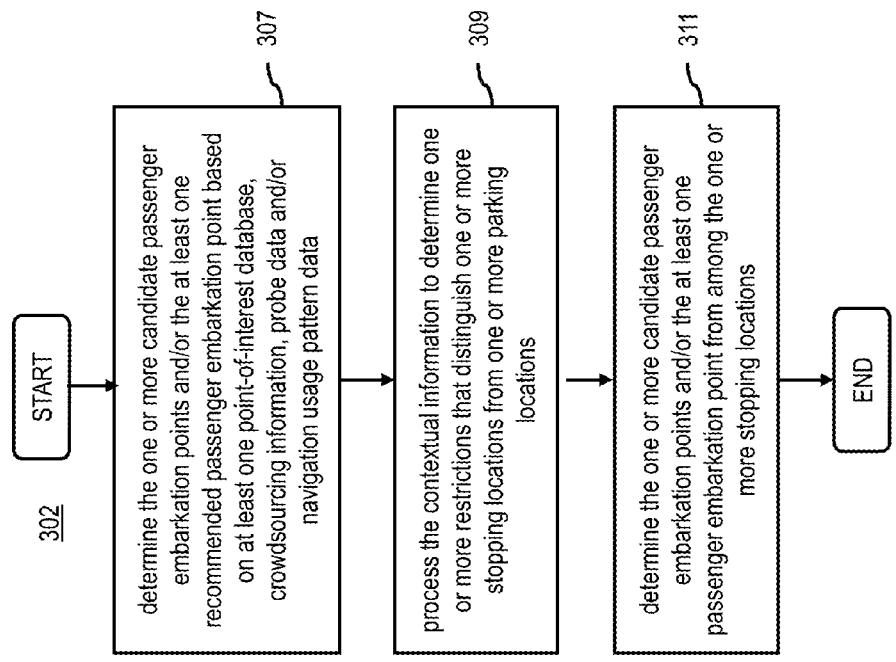
FIGS. 3 and 4 are flowcharts of processes for determining a recommended passenger embarkation point to associate with a point of interest, according to various embodiments.
Figure 3:
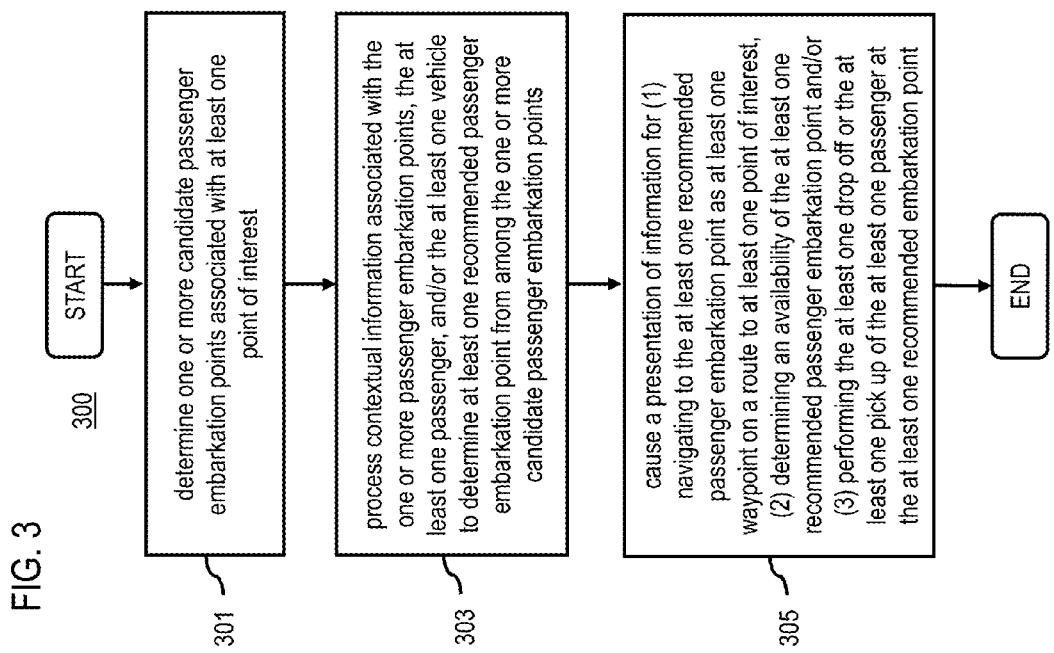
Figure 4:
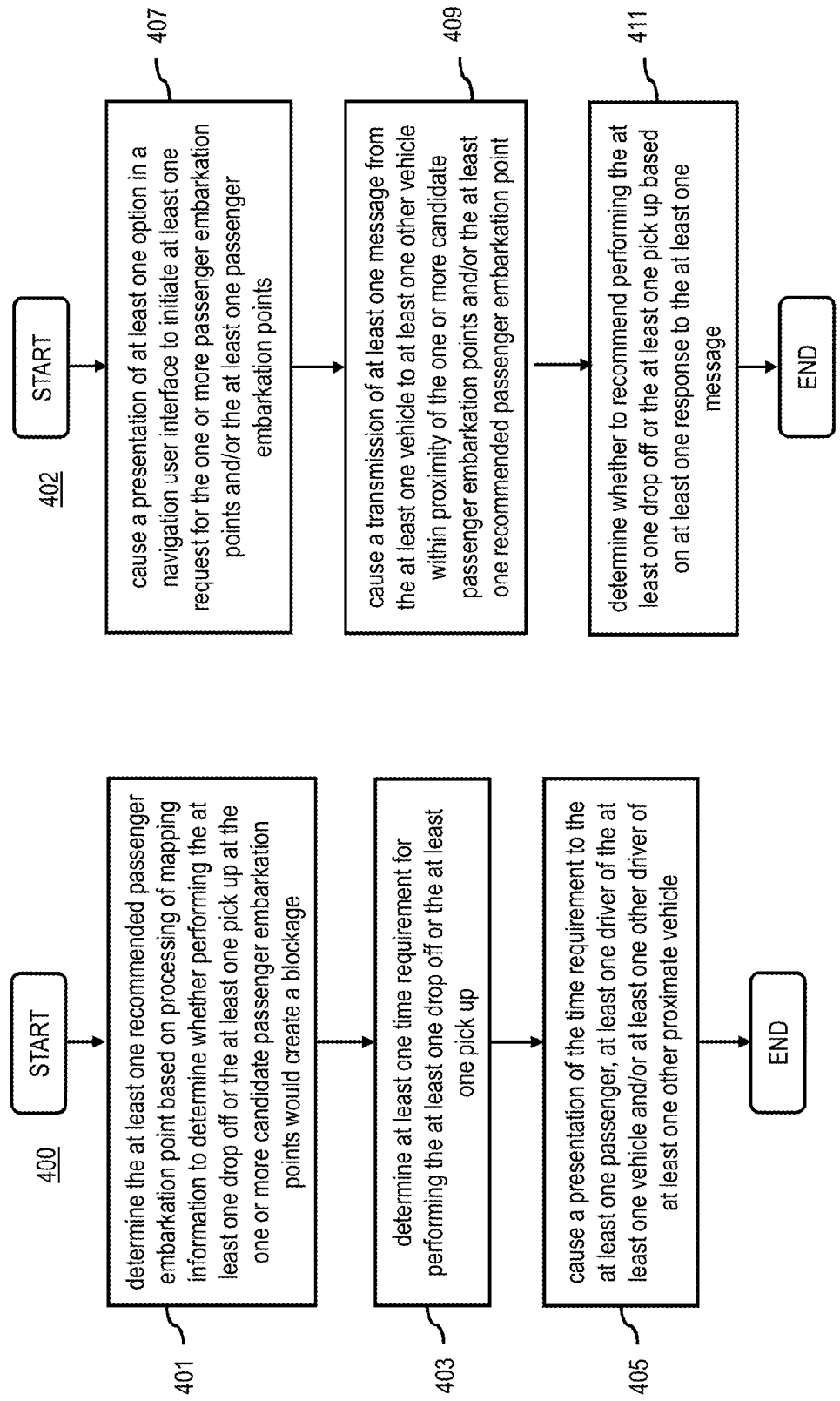
Figure 7:
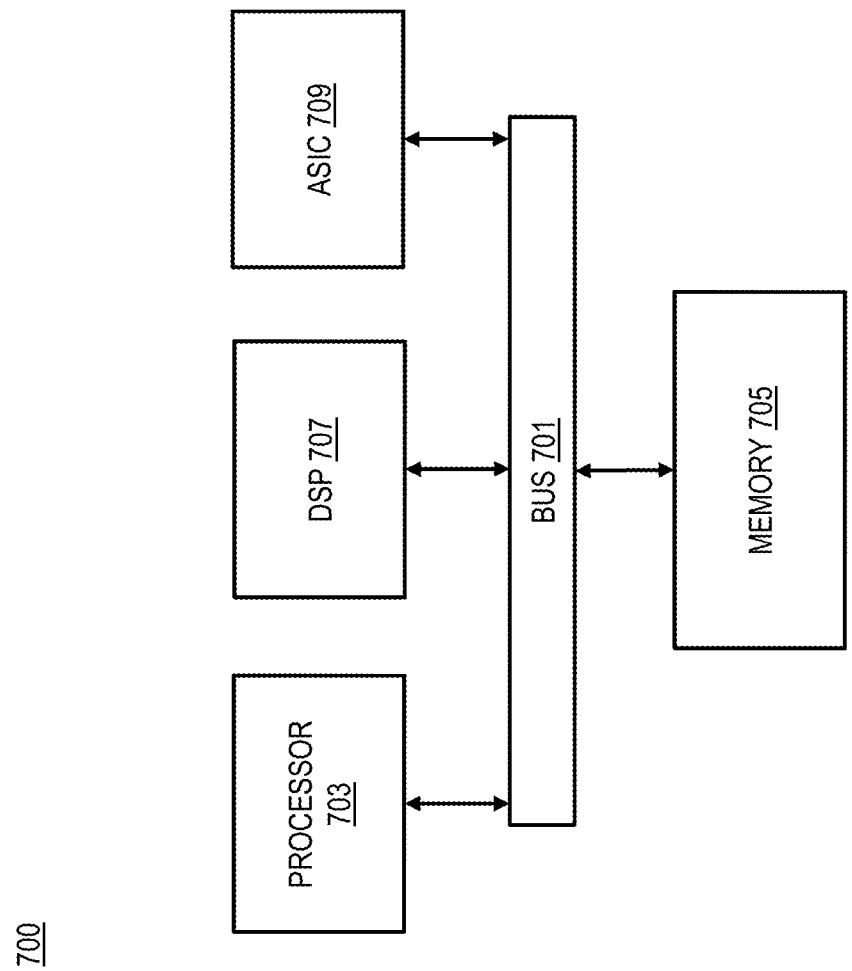
FIG. 7 is a diagram of a chip set that can be used to implement an embodiment of the invention.

FIGS. 3 and 4 are flowcharts of processes for determining a recommended passenger embarkation point to associate with a point of interest, according to various embodiments. In one embodiment, the embarkation platform 103 performs processes 300, 302, 400 and 402 and is implemented in, for instance, a chip set including a processor and a memory as shown in FIG. 7.

In step 301 of process 300, the embarkation platform 103 determines one or more candidate passenger embarkation points associated with at least one point of interest. As noted, the one or more candidate passenger embarkation points are for at least one drop off or at least one pick up of at least one passenger of at least one vehicle. By way of example, the drop off or pick up point may differ from a parking location associated with the point of interest or an entrance to the point of interest. Thus, drop off of pick up locations are distinct points for enabling temporal and/or finite loading and/or unloading of passengers, cargo, etc., as the vehicle is en route to or in proximity of the point of interest.

In step 303, the platform 103 processes contextual information associated with the one or more passenger embarkation points, the at least one passenger and/or the at least one vehicle to determine at least one recommended passenger embarkation point from among the one or more candidate passenger embarkation points. As mentioned, the contextual information includes, at least in part, parking information, traffic information, traffic light information, public transport schedule information, a number of the at least one passenger, physical capability information of the at least one passenger, seat sensor information, luggage information, parcel information, environmental condition information, obstruction information, or a combination. This contextual information may be acquired and/or culled from various sources, including one or more location databases, one or more crowd databases (e.g., for providing crowd-sourced information), one or more service providers, one or more content providers, or a combination thereof.

In another step 305, the embarkation platform 103 causes a presentation of information for (1) navigating to the at least one recommended passenger embarkation point as at least one waypoint on a route to at least one point of interest, (2) determining an availability of the at least one recommended passenger embarkation point and/or (3) performing the at least one drop off or the at least one pick up of the at least one passenger at the at least one recommended embarkation point. The embarkation points may be presented to a requesting UE 101 as one or more graphical, textual, virtual or audible elements for depicting distinct drop-off or pick-up locations. It is noted that the data may be presented in addition to or instead of only a final destination point, a parking location associated with the point of interest, or the like.

In step 307 or process 302, the embarkation platform 103 determines the one or more candidate passenger embarkation points and/or the at least one recommended passenger embarkation point based on at least one point-of-interest database, crowdsourcing information, probe data and/or navigation usage pattern data. In another step 309, the platform 103 processes the contextual information to determine one or more restrictions that distinguish one or more stopping locations from one or more parking locations. As noted, the stopping locations may correspond to one or more pick up or drop off locations. It is noted that the one or more restrictions include, at least in part, one or more parking restrictions, one or more lane restrictions, or a combination thereof. Per step 311, the platform 103 determines the one or more candidate passenger embarkation points and/or the at least one passenger embarkation point from among the one or more stopping locations.

In step 401 of process 400 (FIG. 4), the embarkation platform 103 determines the at least one recommended passenger embarkation point based on processing of mapping information to determine whether performing the at least one drop off or the at least one pick up at the one or more candidate passenger embarkation points would create a blockage. The blockage may be any obstruction caused by the vehicle of the user (e.g., passenger) as a result of pick up or drop off at the recommended embarkation point. The platform 103 may adapt or change the recommended passenger embarkation point when a blockage is determined.

In another step 403, the platform 103 determines at least one time requirement for performing the at least one drop off or the at least one pick up. Per step 405, the platform 103 causes a presentation of the time requirement to the at least one passenger, at least one driver of the at least one vehicle and/or at least one other driver of at least one other proximate vehicle. It is noted that the presentation of the time requirement includes, at least in part, at least one timer indicating an estimated time remaining, an elapsed time, or a combination thereof associated with the at least one drop off or the at least one pick up.

In step 407 of process 402, the embarkation platform 103 causes a presentation of at least one option in a navigation user interface to initiate at least one request for the one or more passenger embarkation points and/or the at least one passenger embarkation points. In another step 409, the platform 103 causes a transmission of at least one message from the at least one vehicle to at least one other vehicle within proximity of the one or more candidate passenger embarkation points and/or the at least one recommended passenger embarkation point. Of note, the at least one message indicates an intent to perform the at least one drop off or the at least one pick up corresponding to the point of embarkation. Per step 411, the platform 103 determines whether to recommend performing the at least one drop off or the at least one pick up based on at least one response to the at least one message. It is noted that this approach facilitates secure drop off or pick up of passengers.

Figure 5A:
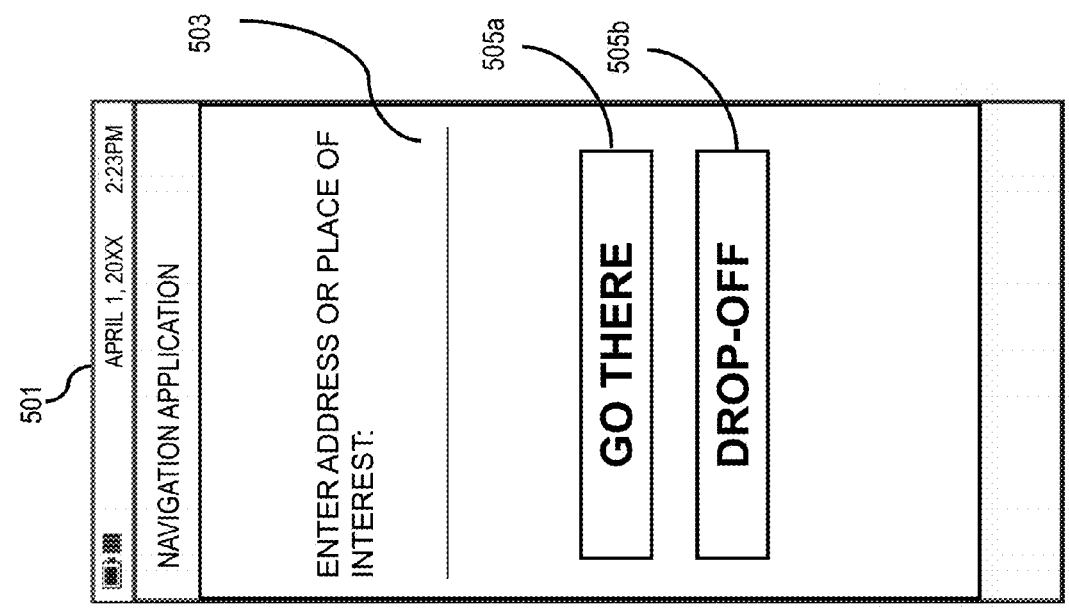
FIG. 5A-5C are diagrams of user interfaces utilized in the processes of FIGS. 3 and 4, according to various embodiments.
Figure 5C:
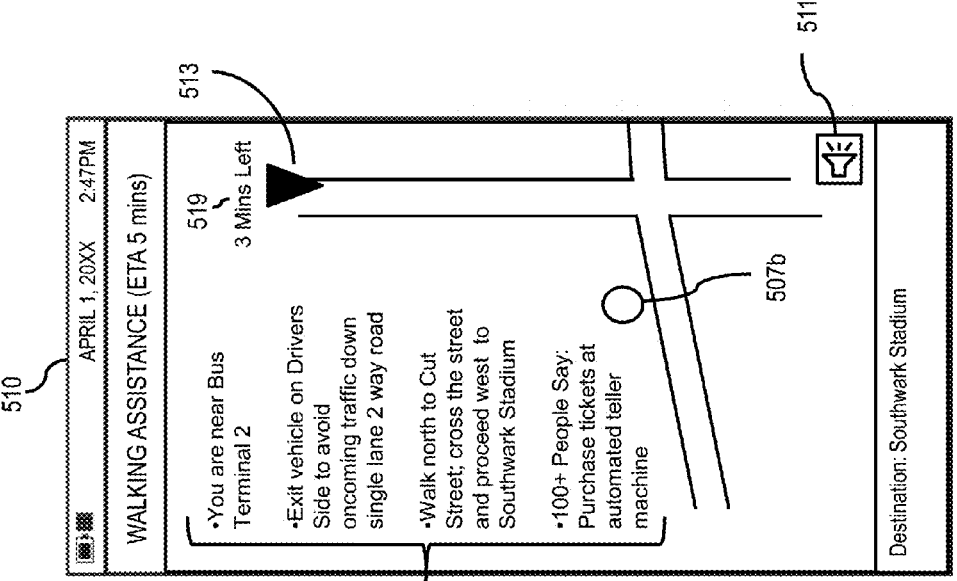
Figure 5B:
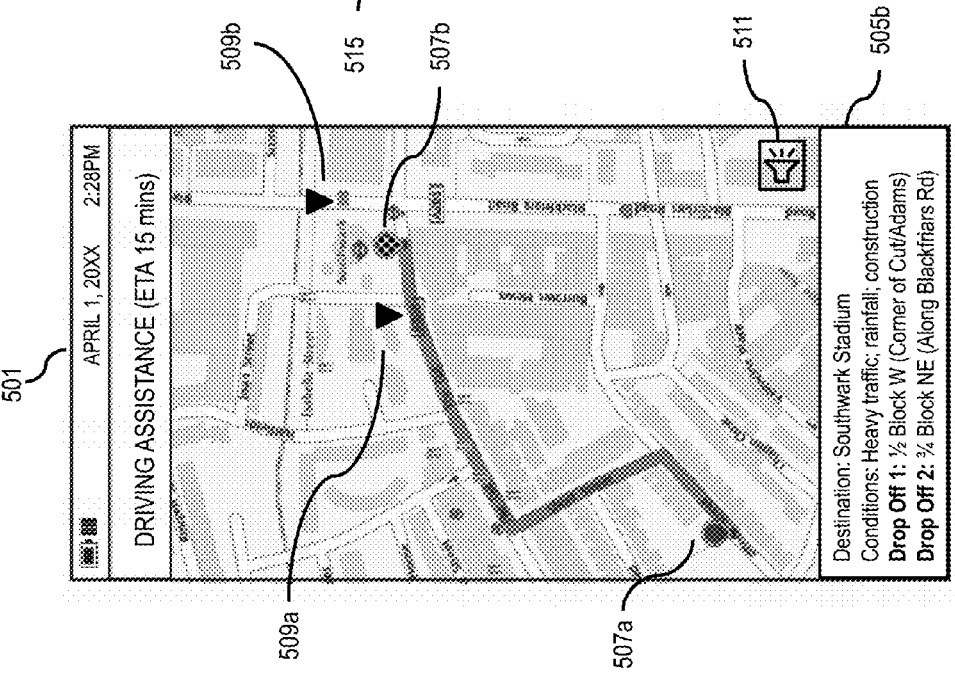

FIGS. 5A-5C are diagrams of user interfaces utilized in the processes of FIGS. 3 and 4, according to various embodiments. As shown, the example user interfaces of FIGS. 5A-5C include one or more user interface elements and/or functionalities created and/or modified based, at least in part, on information, data, and/or signals resulting from the processes (e.g., processes 300 and 400) described with respect to FIGS. 3 and 4. By way of example, the user interfaces of two different mobile devices are depicted. The user of a first device is a driver of a vehicle while the user of the second device is a passenger in the same vehicle. Under this scenario, both devices and are configured with navigation applications and have access to the embarkation platform 103.

In FIG. 5A, the user interface 501 for the device of the driver is shown. In this example, the interface 501 corresponds to a startup screen for the navigation application. The driver is prompted to enter an address or place of interest they wish to navigate to via data entry field 503. In this case, the driver and passenger are travelling to a popular sports stadium to enjoy a game so the driver enters the name "Southwark Stadium)" into the data entry field 503. The user interface also features a GO THERE action button 505a for initiating and acquiring turn-by-turn navigation information from a corresponding navigation service. Alternatively, a DROP-OFF action button 505b is presented for enabling the driver to initiate and acquire one or more recommended drop off locations near the stadium. When the user selects the DROP-OFF action button 505b, the embarkation platform 103 is activated for determining one or more embarkation points.

In response to the request, the embarkation platform 103 processes contextual data associated with the user device of the user, such as temporal information, current device location information, environmental information (e.g., weather), etc., as detected by way of sensor information of the mobile device. In addition, the platform 103 accesses profile information associated with the driver to determine one or more historic navigation usage patterns of the user. Still further, the platform 103 accesses various databases, including crowd databases and one or more location databases for identifying information useful for formulating a drop off location for the user. It is noted that these executions occur concurrent with the retrieval of the navigation information from the navigation service.

In FIG. 5B, the user interface 501 is shown in a Driving Assistance mode in response to selection of the DROP-OFF action button 505b. The Driving Assistance mode presents one or more graphical elements for depicting the route to be traversed by the driver and passenger including a starting point 507a and final destination point 507b (e.g., the stadium). In addition, the user interface 501 presents the current time of travel and expected time of arrival as well as two different drop off points 509a and 509b. The drop off points, represented by markers 509a and 509b, are distinctly different from the final destination point 507b and while within proximity of the stadium, are not representative of parking locations. Guidance information 505b is also rendered to the user interface by the embarkation platform 103 regarding the drop off locations. In this example, the guidance information specifies the destination, one or more conditions that were detected and/or determined as impacting the recommended drop off options and details regarding the two different drop off options.

Having agreed that the passenger will be dropped off at the second drop off location (corresponding to marker 509b) while the driver proceeds to the main parking lot, the driver selects the second drop off location. This may be performed by way of the touch screen functionality of the user interface 501, i.e., by tapping the marker 509b or selecting the text referencing the second drop off point (Drop Off 2) via the guidance information portion of the interface 501. Once selected, the navigation application provides visual and voice based driving assistance to the driver for navigating to the second drop off location 509b. The user may optionally activate or deactivate the voice based guidance by selecting or deselecting the audio symbol 511. In either case, it is noted that the embarkation platform 103 may be fully integrated for use with the navigation application for rendering visual and audio information to the user.

As they are en route to the second drop off point 509b, the passenger decides to activate the navigation application of their device. Resultantly, the mobile device of the passenger detects the presence of the driver's device and also retrieves current location and speed information. In addition, the passenger's device is equipped to interact with various sensors of the vehicle, including both internal and external probes. By processing the sensed data, the embarkation platform 103 is able to recognize an association between the driver and the passenger—i.e., the passenger and driver are frequently referenced in the others user profile because of their travel history together. Resultantly, the embarkation platform 103 links and/or synchronizes the navigation application and settings of the driver with that of the passenger to represent the destination and/or drop off they share in common.

In FIG. 5C, the user interface 510 of the mobile device of the passenger is shown in Walking Assistance mode. This mode of operation is executed based on the exit of the passenger from the vehicle once the vehicle arrived as the second drop off point 509b. Under this scenario, a seat belt sensor for the passenger is detected as inactive; thus alerting the embarkation platform 103 that the passenger has been dropped off. Upon exiting the vehicle, the driver proceeds to find parking while the passenger exits to purchase the tickets. Both the passenger and driver were aware of the limited time they had to execute the drop off given that the drop off location was near/in a bus lane and the next bus was scheduled to arrive in 3 minutes (e.g., as depicted by the countdown timer 519. The embarkation platform 103 provides such data on the basis of public transportation data associated with the city, the current time and location of the users, etc.

The Walking Assistance interface 510 presents the passenger with a marker 513 for depicting their current location and directional bearing relative to stadium location 507b. In addition, the passenger is presented with on screen instructions and details for navigating to the stadium. Under this scenario, the instructions/details 515 include a recommended means of exit from the vehicle by the passenger, turn-by-turn walking directions and feedback/recommendation information that is related to the point of interest. The exit recommendation, for this example, is based on gathered lane and roadway information, current traffic information and the like. Another vehicle within proximity of the passenger may be alerted of the exit recommendation, the current drop off of the user, or any other useful information. The feedback/recommendation information is based on data provided by other patrons of the stadium, including crowd-sourced information. The instructions may also be verbally rendered to the user by the mobile device as they navigate to the destination.

The processes described herein for determining a recommended passenger embarkation point to associate with a point of interest may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
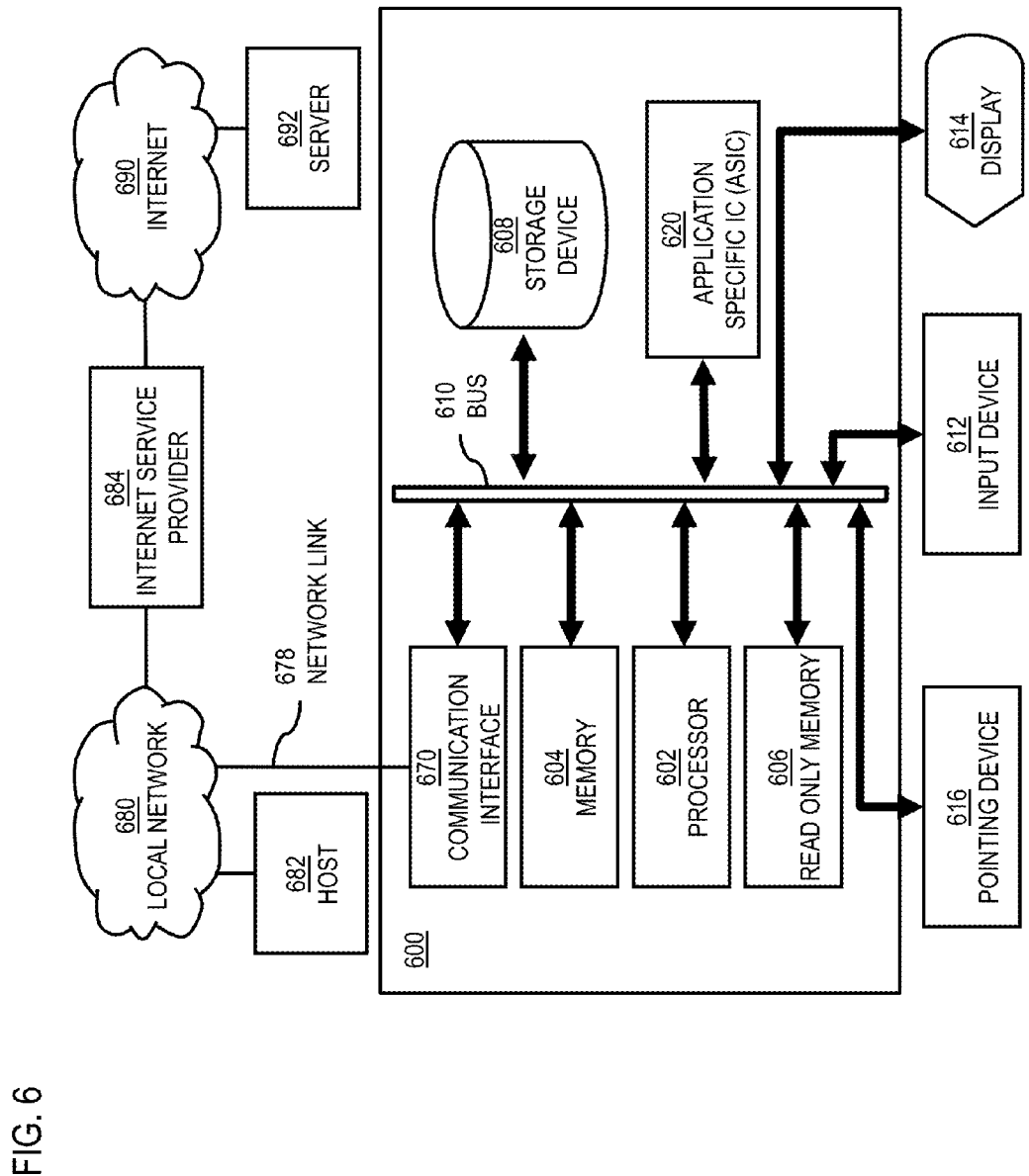
FIG. 6 is a diagram of hardware that can be used to implement an embodiment of the invention.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 5A-5C, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 either use electrical, electromagnetic or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to determine a recommended passenger embarkation point to associate with a point of interest as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of determining a recommended passenger embarkation point to associate with a point of interest.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to determine a recommended passenger embarkation point to associate with a point of interest. The memory 705 also stores the data associated with or generated by the execution of the inventive steps.

Figure 8:
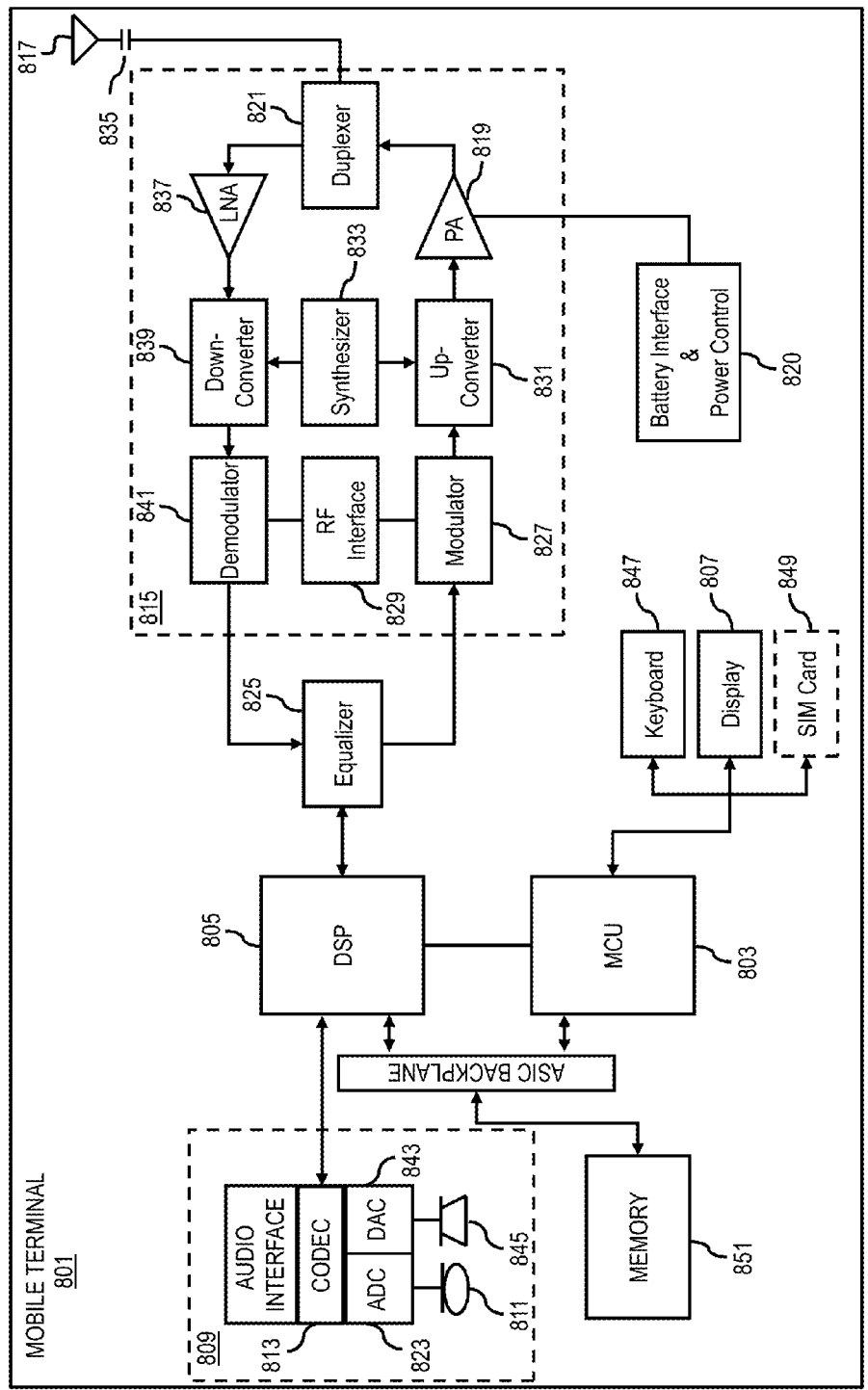
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of determining a recommended passenger embarkation point to associate with a point of interest. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of determining a recommended passenger embarkation point to associate with a point of interest. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to determine a recommended passenger embarkation point to associate with a point of interest. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising facilitating a processing of and/or processing (1) data and/or (2) information and/or (3) at least one signal, the (1) data and/or (2) information and/or (3) at least one signal based, at least in part, on the following:
   at least one determination of one or more candidate passenger embarkation points associated with at least one point of interest, wherein the one or more candidate passenger embarkation points are for at least one drop off or at least one pick up of at least one passenger of at least one vehicle;
   a processing of contextual information associated with the one or more passenger embarkation points, the at least one passenger, the at least one vehicle, or a combination thereof to determine at least one recommended passenger embarkation point from among the one or more candidate passenger embarkation points, wherein the contextual information includes at least weather information provided by a weather service; and
   a presentation of information for (1) navigating to the at least one recommended passenger embarkation point as at least one waypoint on a route to at least one point of interest, (2) determining an availability of the at least one recommended passenger embarkation point, (3) performing the at least one drop off or the at least one pick up of the at least one passenger at the at least one recommended embarkation point, or (4) a combination thereof.

2. A method of claim 1, wherein the (1) data and/or (2) information and/or (3) at least one signal are further based, at least in part, on the following:
   at least one determination of the one or more candidate passenger embarkation points, the at least one recommended passenger embarkation point, or a combination thereof based, at least in part, on at least one point-of-interest database, crowdsourcing information, probe data, navigation usage pattern data, or a combination thereof.

3. A method of claim 1, wherein the (1) data and/or (2) information and/or (3) at least one signal are further based, at least in part, on the following:
   a processing of the contextual information to determine one or more restrictions that distinguish one or more stopping locations from one or more parking locations; and
   at least one determination of the one or more candidate passenger embarkation points, the at least one passenger embarkation point, or a combination thereof from among the one or more stopping locations.

4. A method of claim 1, the one or more restrictions include, at least in part, one or more parking restrictions, one or more lane restrictions, or a combination thereof.

5. A method of claim 1, wherein the (1) data and/or (2) information and/or (3) at least one signal are further based, at least in part, on the following:
   at least one determination of the at least one recommended passenger embarkation point based, at least in part, on processing and/or facilitating a processing of mapping information to determine whether performing the at least one drop off or the at least one pick up at the one or more candidate passenger embarkation points would create a blockage.

6. A method of claim 1, wherein the (1) data and/or (2) information and/or (3) at least one signal are further based, at least in part, on the following:
   at least one determination of at least one time requirement for performing the at least one drop off or the at least one pick up; and
   a presentation of a countdown timer of the time requirement to the at least one passenger, at least one driver of the at least one vehicle, at least one other driver of at least one other proximate vehicle, or a combination thereof.

7. A method of claim 6, wherein the presentation of the time requirement includes, at least in part, at least one timer indicating an estimated time remaining, an elapsed time, or a combination thereof associated with the at least one drop off or the at least one pick up.

8. A method of claim 1, wherein the (1) data and/or (2) information and/or (3) at least one signal are further based, at least in part, on the following:
   a presentation of at least one option in a navigation user interface to initiate at least one request for the one or more passenger embarkation points, the at least one passenger embarkation points, or a combination thereof.

9. A method of claim 1, wherein the (1) data and/or (2) information and/or (3) at least one signal are further based, at least in part, on the following:
   a transmission of at least one message from the at least one vehicle to at least one other vehicle within proximity of the one or more candidate passenger embarkation points, the at least one recommended passenger embarkation point, or a combination thereof, wherein the at least one message indicates, at least in part, an intent to perform the at least one drop off or the at least one pick up; and
   at least one determination of whether to recommend performing the at least one drop off or the at least one pick up based, at least in part, on at least one response to the at least one message.

10. A method of claim 1, wherein the contextual information includes, at least in part, parking information, traffic information, traffic light information, public transport schedule information, a number of the at least one passenger, physical capability information of the at least one passenger, seat sensor information, luggage information, parcel information, environmental condition information, obstruction information, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
    determine one or more candidate passenger embarkation points associated with at least one point of interest, wherein the one or more candidate passenger embarkation points are for at least one drop off or at least one pick up of at least one passenger of at least one vehicle;

process and/or facilitate a processing of contextual information associated with the one or more passenger embarkation points, the at least one passenger, the at least one vehicle, or a combination thereof to determine at least one recommended passenger embarkation point from among the one or more candidate passenger embarkation points, wherein the contextual information includes at least weather information provided by a weather service; and cause, at least in part, a presentation of information for (1) navigating to the at least one recommended passenger embarkation point as at least one waypoint on a route to at least one point of interest, (2) determining an availability of the at least one recommended passenger embarkation point, (3) performing the at least one drop off or the at least one pick up of the at least one passenger at the at least one recommended embarkation point, or (4) a combination thereof.

12. An apparatus of claim 11, wherein the apparatus is further caused to:

determine the one or more candidate passenger embarkation points, the at least one recommended passenger embarkation point, or a combination thereof based, at least in part, on at least one point-of-interest database, crowdsourcing information, probe data, navigation usage pattern data, or a combination thereof.

13. An apparatus of claim 11, wherein the apparatus is further caused to:

process and/or facilitate a processing of the contextual information to determine one or more restrictions that distinguish one or more stopping locations from one or more parking locations; and determine the one or more candidate passenger embarkation points, the at least one passenger embarkation point, or a combination thereof from among the one or more stopping locations.

14. An apparatus of claim 11, wherein the one or more restrictions include, at least in part, one or more parking restrictions, one or more lane restrictions, or a combination thereof.

15. An apparatus of claim 11, wherein the apparatus is further caused to:

determine the at least one recommended passenger embarkation point based, at least in part, on processing and/or facilitating a processing of mapping information to determine whether performing the at least one drop off or the at least one pick up at the one or more candidate passenger embarkation points would create a blockage.

16. An apparatus of claim 11, wherein the apparatus is further caused to:

determine at least one time requirement for performing the at least one drop off or the at least one pick up; and cause, at least in part, a presentation of a countdown timer of the time requirement to the at least one passenger, at least one driver of the at least one vehicle, at least one other driver of at least one other proximate vehicle, or a combination thereof.

17. An apparatus of claim 16, wherein the presentation of the time requirement includes, at least in part, at least one timer indicating an estimated time remaining, an elapsed time, or a combination thereof associated with the at least one drop off or the at least one pick up.

18. An apparatus of claim 11, wherein the apparatus is further caused to:

cause, at least in part, a presentation of at least one option in a navigation user interface to initiate at least one request for the one or more passenger embarkation points, the at least one passenger embarkation points, or a combination thereof.

19. An apparatus of claim 11, wherein the apparatus is further caused to:

cause, at least in part, a transmission of at least one message from the at least one vehicle to at least one other vehicle within proximity of the one or more candidate passenger embarkation points, the at least one recommended passenger embarkation point, or a combination thereof, wherein the at least one message indicates, at least in part, an intent to perform the at least one drop off or the at least one pick up; and determine whether to recommend performing the at least one drop off or the at least one pick up based, at least in part, on at least one response to the at least one message.

20. A method of claim 1, wherein the contextual information includes, at least in part, parking information, traffic information, traffic light information, public transport schedule information, a number of the at least one passenger, physical capability information of the at least one passenger, seat sensor information, luggage information, parcel information, environmental condition information, obstruction information, or a combination thereof.

* * * * *